(12) United States Patent
Balram et al.

(10) Patent No.: US 9,100,647 B1
(45) Date of Patent: Aug. 4, 2015

(54) FILM GRAIN GENERATOR

(75) Inventors: Nikhil Balram, Mountain View, CA (US); Shilpi Sahu, Bangalore (IN); Sanjay Garg, Bangalore (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 1439 days.

(21) Appl. No.: 11/969,626

(22) Filed: Jan. 4, 2008

Related U.S. Application Data

(60) Provisional application No. 60/883,586, filed on Jan. 5, 2007, provisional application No. 60/883,591, filed on Jan. 5, 2007, provisional application No. 60/883,593, filed on Jan. 5, 2007.

(51) Int. Cl.
*H04N 5/08* (2006.01)
*H04N 19/117* (2014.01)
*H04N 19/137* (2014.01)
*H04N 19/124* (2014.01)

(52) U.S. Cl.
CPC ........... *H04N 19/117* (2014.11); *H04N 19/124* (2014.11); *H04N 19/137* (2014.11)

(58) Field of Classification Search
CPC ... H04N 19/176; H04N 19/86; H04N 19/117; H04N 19/124
USPC ................. 348/22, 32, 239, 441, 532–534; 375/240.27
See application file for complete search history.

(56) References Cited

U.S. PATENT DOCUMENTS

| | | | | |
|---|---|---|---|---|
| 5,831,673 | A * | 11/1998 | Przyborski et al. | 348/239 |
| 6,868,190 | B1 * | 3/2005 | Morton | 382/278 |
| 6,990,252 | B2 * | 1/2006 | Shekter | 382/276 |
| 7,295,673 | B2 * | 11/2007 | Grab et al. | 380/239 |
| 7,349,574 | B1 * | 3/2008 | Sodini et al. | 382/168 |
| 2006/0119627 | A1 * | 6/2006 | Yamada et al. | 345/694 |
| 2007/0046686 | A1 * | 3/2007 | Keller | 345/581 |
| 2007/0070241 | A1 * | 3/2007 | Boyce et al. | 348/441 |
| 2008/0152250 | A1 * | 6/2008 | Gomila et al. | 382/260 |

* cited by examiner

*Primary Examiner* — Pankaj Kumar
*Assistant Examiner* — Alazar Tilahun

(57) ABSTRACT

High-frequency noise is generated that approximates the appearance of traditional "film grain" for a digital video signal. By adding a relatively small amount of film grain noise, the video can be made to look more natural and more pleasing to the human viewer. The digital film grain generator can generate film grain in real-time. The generated film grain is preferably free from spatial or temporal patterns. Level adaptivity adjusts the amount of variation permitted for each pixel within a programmable range.

22 Claims, 12 Drawing Sheets

FILM GRAIN GENERATOR

CROSS-REFERENCE TO RELATED APPLICATION

This application claims the benefit of U.S. Provisional Patent Application Nos. 60/883,586, filed Jan. 5, 2007, 60/883,591, filed Jan. 5, 2007, and 60/883,593, filed Jan. 5, 2007, which are all hereby incorporated herein by reference in their entirety.

This application is related to U.S. patent application Ser. No. 11/313,577, which was filed on Dec. 20, 2005 and was published as U.S. Patent Publication No. 2007/0140588. The disclosures of this application are hereby incorporated by reference in its entirety.

BACKGROUND

This invention relates generally to image and video processing, and more particularly to film grain generation for digital video enhancement.

Traditional motion picture film stock emulsions contain silver halide crystals that reduce after the film stock is exposed and processed and cluster to form miniature "grains." These film grains make up the image on a piece of film stock. Often the clustering of the film grains is not uniform, giving rise to slight variations that are visible in the film. Various cinematographers have commented that film stock produces a more aesthetically pleasing look than digital video, even when very high-resolution digital sensors are used. This aesthetically pleasing look of the film stock results (at least in part) from the randomly occurring, continuously moving high frequency film grain (as compared to the fixed pixel grid of a digital sensor). This "film look" has sometimes been described as being more "creamy and soft" in comparison to the more "harsh" look of digital video.

Compressed or low-quality digital video also suffers from various imperfections and artifacts. Unlike, film grain, these digital imperfections are not aesthetically pleasing and detract from the appearance of the digital video.

It would therefore be desirable to provide a film grain generator that can approximate the appearance of film grain in digital video. The presence of this generated film grain within digital video can provide the digital video with the desired "film look" as well as masking the appearance of unpleasant digital imperfections.

SUMMARY

In accordance with embodiments of the invention a film grain generator is provided. The film grain generator can produce high-frequency noise that approximates the appearance of traditional "film grain" for a digital video signal. By adding a relatively small amount of film grain noise, the video can be made to look more natural and more pleasing to the human viewer.

Generating high-frequency noise that has the visual property of film grain can be used to mask unnatural smooth artifacts like "blockiness" and "mosquito noise" in the case of compressed video. Moreover, simply adding the film grain-like high-frequency noise can provide a visual enhancement or special effect to any digital video stream.

Certain in-loop and post-processing algorithms can also be used to reduce blockiness and mosquito noise. However, in the process of compression, de-compression and removal of artifacts, a video signal can often lose a natural-looking appearance and instead can acquire a "patchy" appearance. Addition of film grain noise to the digital video can improve the results of the artifact removal by adding texture to the patchy looking areas of the image.

Another important application for film grain generation is for creating a perceptual improvement in low-resolution video when presented on a TV display that has a higher resolution than the original content. In many cases, the low-resolution video has limited detail and artifacts such as block or mosquito noise are mistaken by the human viewer as part of a false-perception of image detail. During the course of processing such video streams for display on a high-resolution large-screen display, filtering removes such artifacts. The resulting video may be free of distracting artifacts but is now perceived by consumers to be too soft. The addition of film grain creates a perception of detail that provides a more pleasing viewing experience.

In order to appear like traditional film grain, the digitally generated film grain should appear to be random and without any perceptible spatial or temporal pattern and should preferably be fine enough so as not to be a distraction to the viewer. In some embodiments, the magnitude of the generated film grain to be added to a digital video can be adapted based on the values of the individual pixels that make up the digital video. For example, very dark and very light regions in a digital video may have less film grain added to them than other regions.

Further features of the invention, its nature and various advantages, will be more apparent from the accompanying drawings and the following detailed description of various embodiments.

DETAILED DESCRIPTION

Figure 1:
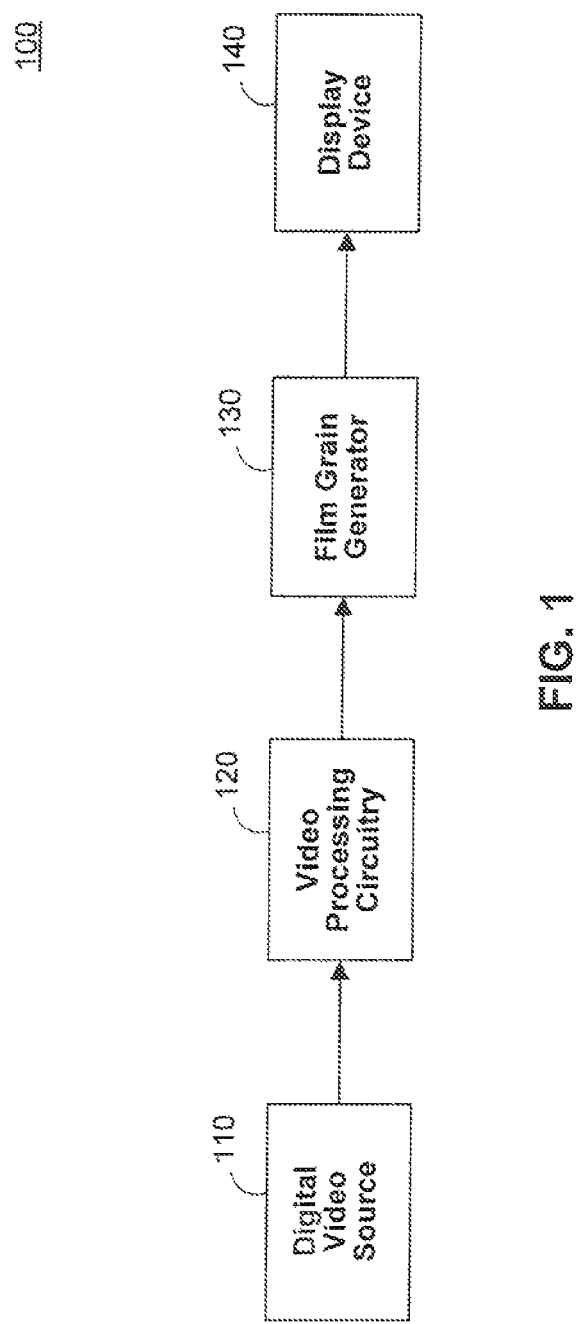
FIG. 1 is an illustrative block diagram of a film grain generation system in accordance with one aspect of the invention.

FIG. 1 is an illustrative block diagram of a film grain generation system in accordance with one aspect of the invention. Film grain generation system 100 includes digital video source 110, video processing circuitry 120, film grain generator 130, and display device 140. The digital video source can be any suitable source of digital video such as, for example, an MPEG decoder for decoding MPEG-encoded data on a DVD, PC, or portable media device. The decoded digital video stream (in digital format) is input to video processing circuitry 120. Video processing circuitry 120 can include, for example, an MPEG blocking and mosquito noise reducer. The MPEG noise reducer is provided to reduce blocking and mosquito noise artifacts present in the decoded stream. Video processing circuitry 120 can also include a video interlacer, a video de-interlacer, a video scaler, or any other suitable processing circuitry. The processed digital video stream is then input to film grain generator 130. A bypass path (not shown) can provide the decoded digital video stream directly to film grain generator 130, bypassing video processing circuitry 120. In a bypass mode of operation, the film grain data can still be added to the decoded digital video stream, which can have the effect of masking the digital video artifacts without additional processing.

For ease of explanation, the digital video stream illustrated in film grain generation system 70 represents only the luminance channel (i.e., the "Y" channel) of a digital stream in the YCbCr domain. Thus, film grain is added to the luminance channel while MPEG noise reduction processing is also occurring on luminance channel path. To compensate for the additional processing delays, the chrominance channels (i.e., the "Cb" and "Cr" channels) can be accordingly delay balanced (to maintain synchronization of chroma and luma information, for example). However, it should be understood that in accordance with embodiments of the invention film grain can also be added to the chrominance channels. Alternatively, in an RGB domain film grain can similarly be added to any or all of the channels.

To help control the degree of film grain generation (to optimize the aesthetic quality of any given digital video stream, for example), attributes (such as the grain size and the amount of film grain that needs to be added) of film grains can be controlled. In particular, controlled film grain addition can be useful for masking MPEG or other compression artifacts such as block boundaries and mosquito noise, improving perceived detail for low resolution and washed out video streams, or providing an aesthetic "film look" to video.

Figure 2:
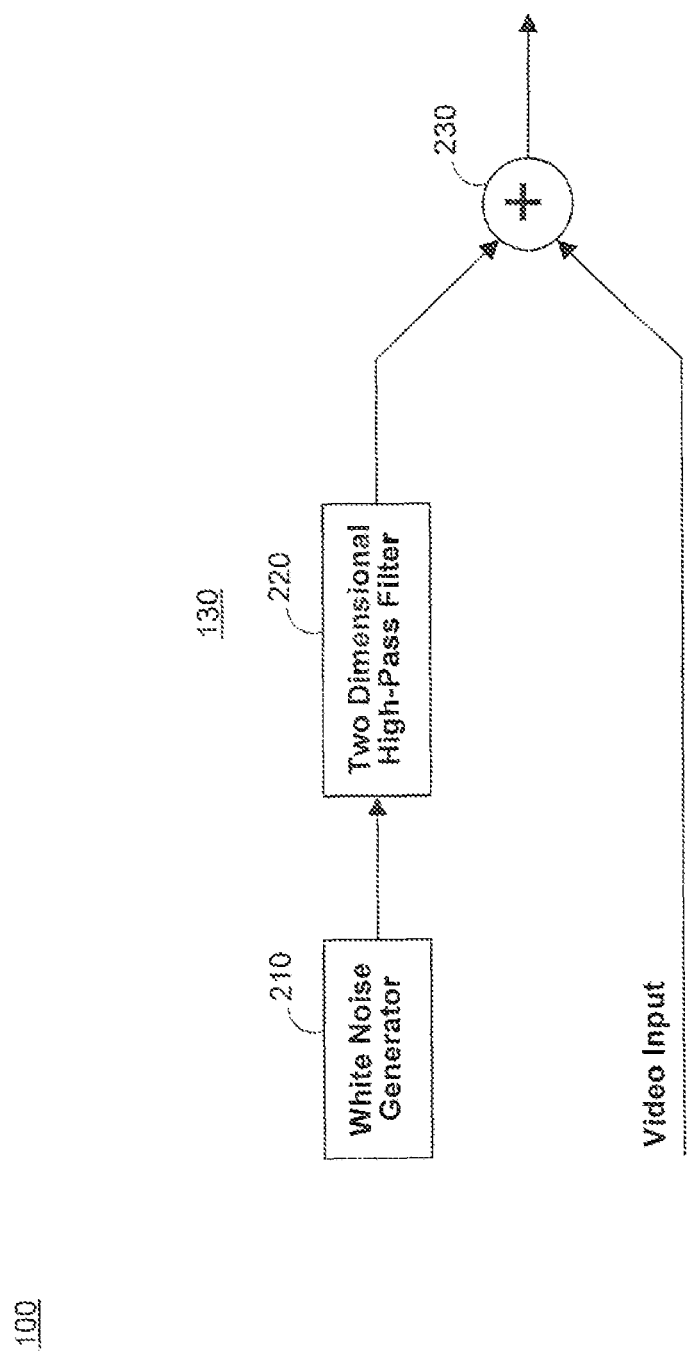
FIG. 2 is an illustrative block diagram of a film grain generator and mechanism to add film grain data to incoming video data in accordance with one aspect of the invention.

FIG. 2 is an illustrative block diagram of a film grain generator 130 and mechanism to add film grain data to incoming video data in accordance with one aspect of the invention. Film grain generator 130 includes white noise generator 210, two-dimensional high pass filter 220, and summing node 230.

White noise generator 210 generates white noise, which is a random signal with a flat power spectral density across a wide range of frequencies. This white noise is for example generated by white noise generator 210 in real time or in substantially real time. This is in sharp contrast to previous film grain generators in which the noise patterns used by the film grain generator were generated in advance, stored in memory and then repeatedly applied across a video frame. By continuously generating a new white noise signal, film grain generator 130 can generate film grain that is free of any obvious spatial or temporal patterns. Further, white noise generator 210 does not require large memory buffers to store predetermined noise patterns.

Figure 3:
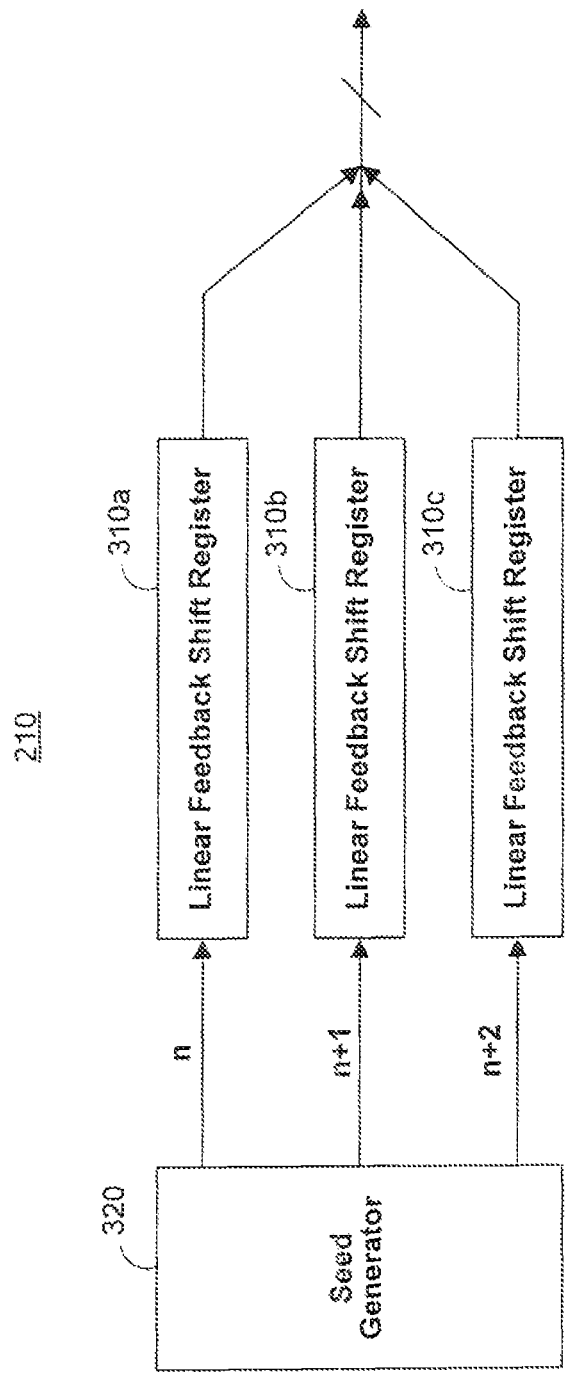
FIG. 3 is an illustrative block diagram of a white noise generator that can be used to generate film grain noise in accordance with one aspect of the invention.

FIG. 3 is an illustrative block diagram of white noise generator 210 that can be used to generate film grain noise in accordance with one aspect of the invention. In this embodiment, a 32-bit maximal length polynomial is used for generating the white noise sequence. The polynomial is implemented as a Fibonacci-type Linear Feedback Shift Register (LFSR) 310 with XOR gates for feedback (not shown). The contents of LFSRs 310 repeat with a sequence length of $2^{32}-1$, thus each period of the register sequence contains $2^{32}-1$ unique 32-bit values. Three separate LFSRs 310 that are seeded by seed generator 320 provide parallel outputs for three separate lines from a video frame. This aspect of the invention will be described in greater detail below.

While the outputs of LFSRs 310 are pseudorandom in nature, it has been observed that if 8-bit words are tapped sequentially from these 32-bit registers and arranged as a 2-D image in raster scan order, the image shows some correlation in the horizontal direction (and yet appears random in the vertical direction). This correlation has been observed even when the image of 8 bit words were calculated to represent a uniform distribution of white noise—i.e., a uniform distribution of values with a flat frequency spectrum. One technique that can remove this horizontal correlation, is to clock the LFSR at a rate that exceeds the pixel rate. For example, LFSRs 301 can be combinationally clocked at 4 times the pixel rate. This is equivalent to taking every 4th bit value of the LFSR. A 8-bit word thus generated retains the properties of flat frequency spectrum and uniform random distribution, but also appear to have no horizontal correlation. A video frame of size 1920×1080 is of the order of $2^{21}$ pixels. With a 32 bit LFSR, even after jumping every 4th value in the sequence, the LFSR still generates a sequence length of the order of $2^{30}$ bits. Therefore, even for a frame of the size 1920×1080, there will be no chance of a repetitive pattern in the generated noise in the same frame.

It should be understood that while white noise generator 210 of FIG. 3 uses Fibonacci-type LFSRs 310 with an overclocking rate of 4, many other suitable pseudorandom generator polynomials and clocking rates may be used. However, some polynomials may require a higher clock rate in order to provide an acceptable, non-patterned, white noise sequence.

Returning to FIG. 2, the white noise output of white noise generator 210 is input to two-dimensional high-pass filter (HPF) 220. The requirements for HPF 220 are not very stringent. It need not have very high stop-band attenuation, a flat pass band or a steep transition band. The purpose of HPF 220 is merely to filter out some of the low-frequency (i.e., larger) pieces of film grain which can be less visually pleasing than the smaller pieces. Because HPF 220 receives a white noise input and filters out some of the lower frequencies, the output of HPF 220 can be referred to as blue noise.

In order for HPF 220 to filter the noise in the vertical direction, multiple horizontal lines of delayed noise are needed. One technique is to use line-buffers for storing these multiple lines of delayed noise. For 8 bit noise values, in order to have three lines for filtering, storage of two lines is required. Thus, for a line of size 1920 pixels, a line buffer of size 30,720 bits (i.e., 2×1920×8) will be needed. Another way to generate multiple vertical lines is to simulate the line delays using multiple pseudorandom generator polynomials such as LFSRs 310a, 310b, and 310c of FIG. 3. Because the noise generated by LFSRs 310 is independent of the incoming video inputs pixels, the multiple lines of delayed noise can be generated in the following manner without the use of line buffers. First, multiple LFSRs 310 are initialized with a common seed in the vertical blanking interval by seed generator 320. In order to have three lines of noise to provide to HPF 220, 3 LFSRs 310 are need. A greater number of lines can also be supported, if required, by instantiating more LFSRs 310 running in parallel. One LFSR 310a runs only in the active data region and provides the first line of noise. The second LFSR 310b runs one line in advance than the first one, in the blanking time, and provides the second line of noise. Similarly, the third LFSR 310c runs in advance by two lines to provide the third line of noise. Together, the three LFSRs 310 recreate the required vertical lines without requiring any line buffers. Seed generator 320 provides LFSRs 310 with the appropriate seed values in order to generate these three sequential lines of noise.

True film grain patterns are usually different from frame to frame, since graininess pattern is unique to the piece of film stock on which each frame is recorded. This kind of temporal variation can be incorporated in the hardware implementation by initializing LFSRs 310 with seed generator 320 to a different seed value for every frame. For a frame of size of the order of $2^{11}$ pixels it would takes about $2^{19}$ frames for LFSRs 310 to repeat the same sequence. This temporal repetition is therefore not noticeable. However, if static film grain is desired, the seed values of the three LFSRs 310 can be reset to the same values at the beginning of every frame. Usually this is not preferable since the static noise pattern can be distracting to the viewer. In some embodiments, the seed values can also be changed at a slower pace such as every nth frame, where n can be any value up to 254.

Temporal variations in the generated film grain results in low pass filtering by the eye in the temporal direction. As a result of this low pass filtering, the grains appear much finer when the grain pattern changes every frame. Therefore, the size of the film grain can also be controlled by varying the seed at a slower rate. Lowering the rate of change of the seeds will increase the perceived size of the film grain.

Once the film grain is output by HPF 220, it can be added to the incoming pixels of the video by summing node 230. In some embodiments, summing node 230 can scale all of the noise values with a fixed, programmable gain before they are added to the pixel values. One shortcoming of this technique, however, is the potential reduction in contrast of the image processed with this generated film grain (i.e., the near-black regions in the video frame will become lighter and the near-white regions in the video frame will become darker). For example, consider a dark and flat region with luma value of 16 (e.g., a letterbox region). If film grain with maximum swing of 20 (+ and – and with zero mean) is added to this region, the negative swing of the luma gets clamped by 0. Therefore, the maximum negative swing of the pixel after film grain addition is only 16 while the maximum positive swing is 20. So, after clamping, the mean of the noise that is added to the region is a positive number instead of zero. As a result, the average perceived brightness of the region goes up. Additionally, it may not be desirable to add any film grain to the pixels within a letterbox region as film grain in the letterbox region will detract from the perceived quality of the picture. For the same reasons as with the dark regions, the near white regions may appear darker due to clamping at the maximum luminance values, thereby reducing the perceived dynamic range of the output video.

One technique for reducing the negative effects of additive noise to the pixels having extreme luminance values is to use a programmable, adaptive gain to limit the amount of noise that is added those pixels having extreme luminance values instead of a fixed gain. For example, two guard band regions can be provided. A first guard band region is near the maximum possible luminance value and a second guard band region is near the minimum possible luminance value, in order to prevent any noise from being adding to pixels falling within those bands. These guard bands help to preserve the dark and white regions including letterboxes.

Figure 4:
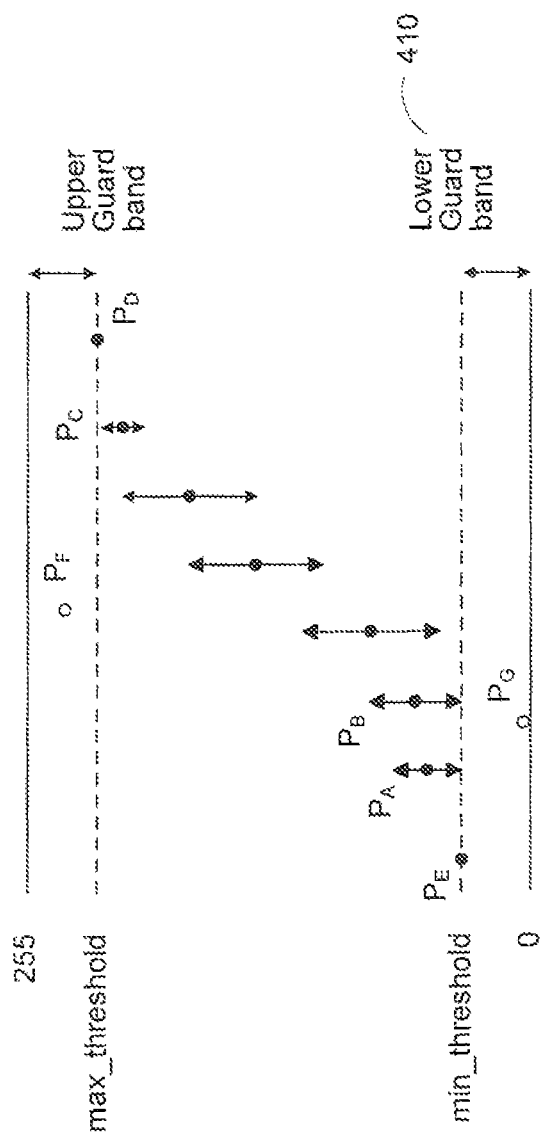
FIG. 4 is an illustrative diagram of adaptive gain on film grain amplitude based on pixel intensity value.

FIG. 4 is an illustrative diagram of one exemplary adaptive gain scheme for adjusting film grain amplitude based on pixel intensity values. In FIG. 4, the minimum luminance value is zero and the maximum value of 255. Lower guard band 410 is set to a programmable value, min_threshold, a luminance value close to the zero (e.g., 16). Upper guard band 420 is set to a programmable value, max_threshold, a luminance value close to 255 (e.g., 235). In FIG. 4, the luminance values of various pixels are shown. The vertical arrows about the pixel show the maximum allowable swing from the pixel's value. The lower threshold min_threshold and upper threshold max_threshold provide a programmable range within which pixels luminance values are allowed to change.

Pixels $P_A$, $P_B$, and $P_C$ have luminance values close to the guard band regions, so their swing will be restricted by the adaptive algorithm to values that are between min_threshold and max_threshold. Pixels $P_D$ and $P_E$ are located on the guard band boundary, so the swing of the noise added to these pixels is zero. Pixels $P_F$ and $P_G$ are located deep inside the guard band regions, so they are excluded from film grain addition. For all other pixels whose grey levels are well between min_threshold and max_threshold, film grain amplitude will not be modified, i.e. it will be full swing. Thus, it can be seen that the adaptive logic helps in gradual gradation of amplitude of film grain from one guard band to the other. This adaptive scheme is merely illustrative and it should be understood that any suitable technique for varying film grain intensity based on the incoming video data may also be used.

Figure 5:
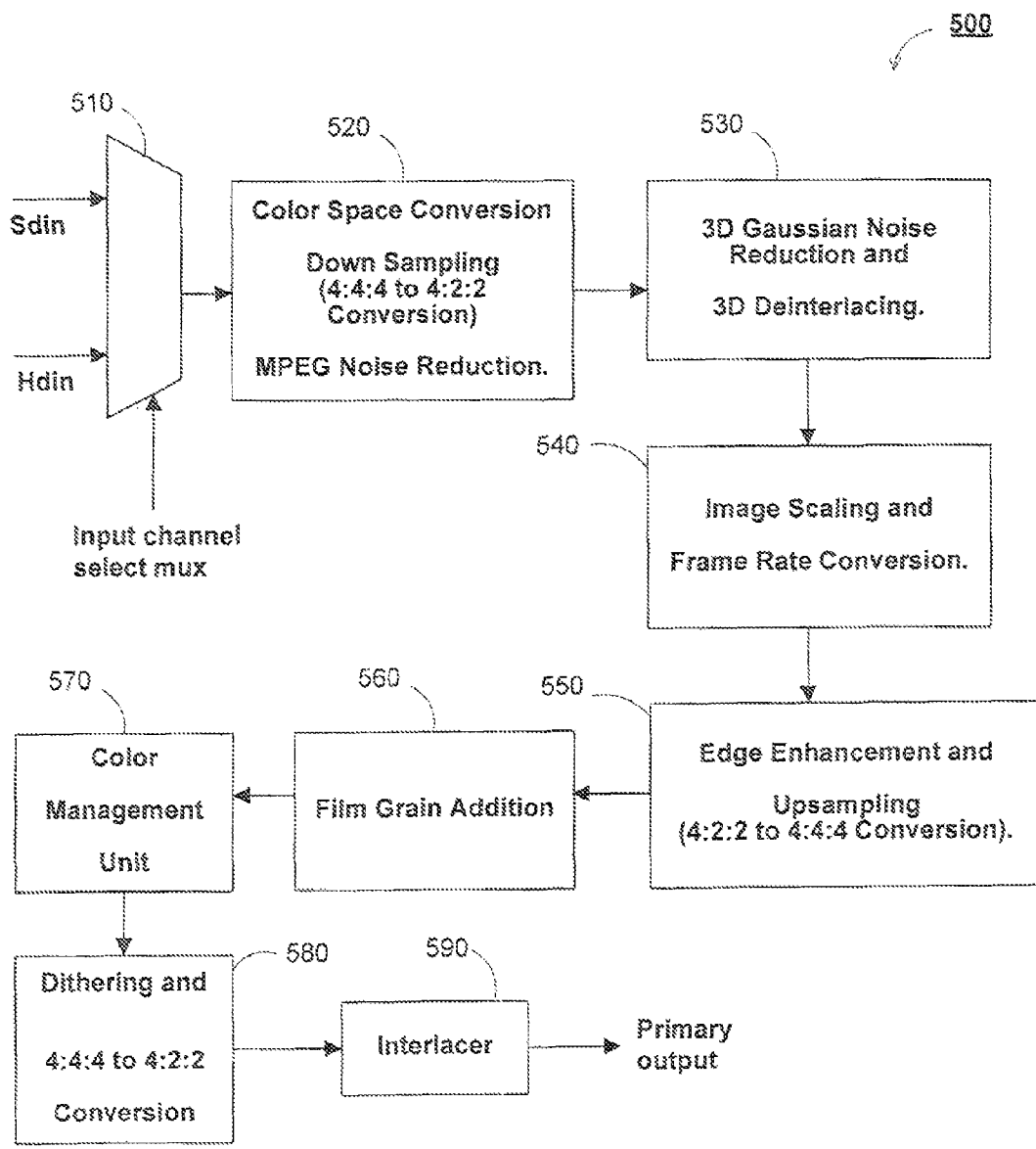
FIG. 5 is an illustrative block diagram of a film grain generator within an exemplary video processing circuit implemented in an integrated circuit in accordance with one aspect of the invention.

FIG. 5 is an illustrative block diagram of a film grain generator within an exemplary video processing circuit implemented in an integrated circuit in accordance with one aspect of the invention. For simplicity, the modules of the figure are illustrated as having more than one functionality within in single module. In various embodiments these functionalities can be implemented using single modules or can be distributed across several modules. Additionally, the various modules in this circuit can have bypass functionality such that the functions within those modules can be bypassed if desired.

Module 510 permits selection of a video data stream from between, for example, standard definition video (NTSC or PAL) or high definition. Module 520 implements color space conversion and can down sample the video input stream. Module 520 can also optionally provide MPEG noise reduction. Module 530 can be used to provide three-dimensional Gaussian noise reduction and be further used to de-interlace image frames. Module 540 can be used to scale image frames within the video signal and provide frame rate conversion. Module 550 can be used to perform edge enhancement in the video signal while also performing up-sampling duties.

Film grain generation can be performed in Module 560 such that the film grain is added to the video signal being processed. Module 570 provides color processing functions such as color enhancement and preservation. Module 580 can be used to dither (and down-sample) output video data for displays that, for example, have lower resolution than the output video data. Module 590 can be used to interlace frames associated with the output video data, if desired. In some embodiments, film grain generation Module 560 may be placed after Module 570 in the pipeline in order to add film grain to the chroma channel after the color enhancement and preservation of Module 570.

Referring now to FIGS. 6A-6G, various exemplary implementations of the present invention are shown.

Figure 6A:
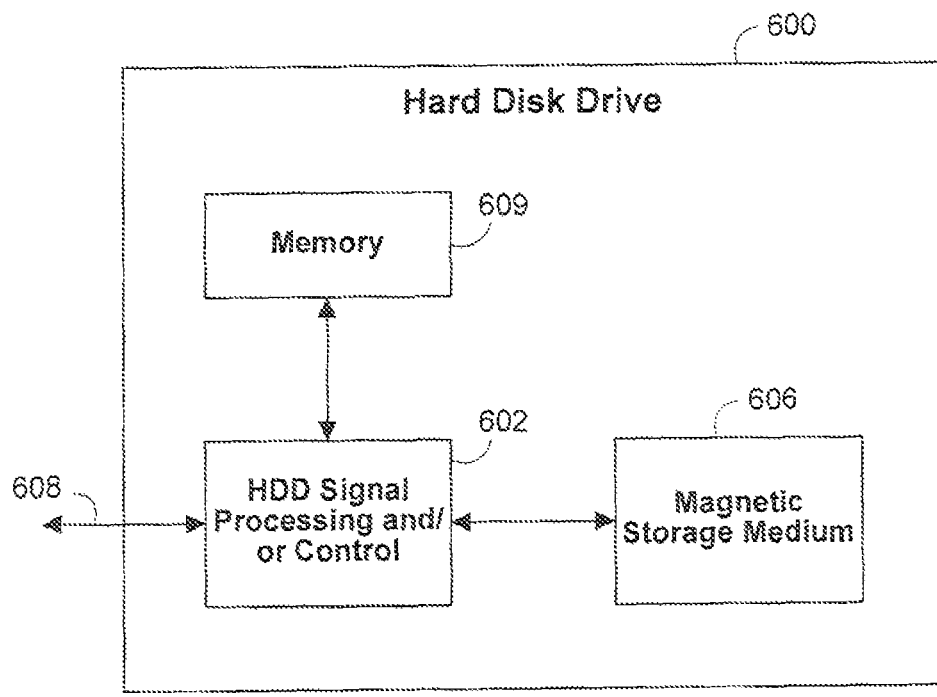
FIG. 6A is a block diagram of an exemplary hard disk drive that can employ the disclosed invention.

Referring now to FIG. 6A, the present invention can be implemented in a hard disk drive 600. The present invention may be implemented as part of the signal processing and/or control circuits, which are generally identified in FIG. 6A at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular phones, media or MP3 players and the like, and/or other devices via one or more wired or wireless communication links 608. The HDD 600 may be connected to memory 609 such as random access memory (RAM), nonvolatile memory such as flash memory, read only memory (ROM) and/or other suitable electronic data storage.

Figure 6B:
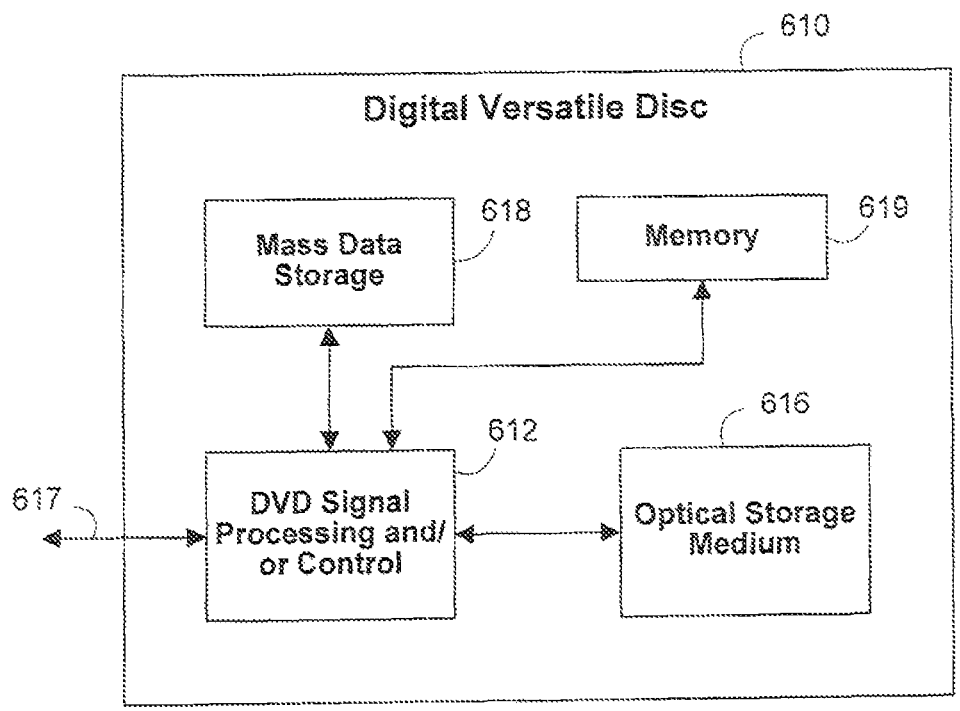
FIG. 6B is a block diagram of an exemplary digital versatile disc that can employ the disclosed invention.

Referring now to FIG. 6B, the present invention can be implemented in a digital versatile disc (DVD) drive 610. The present invention may be implemented as part of the signal processing and/or control circuits, which are generally identified in FIG. 6B at 612, and/or mass data storage 618 of the DVD drive 610. The signal processing and/or control circuit 612 and/or other circuits (not shown) in the DVD 610 may process data, perform coding and/or encryption, perform calculations, and/or format data that is read from and/or data written to an optical storage medium 616. In some implementations, the signal processing and/or control circuit 612 and/or other circuits (not shown) in the DVD 610 can also perform other functions such as encoding and/or decoding and/or any other signal processing functions associated with a DVD drive.

The DVD drive 610 may communicate with an output device (not shown) such as a computer, television or other device via one or more wired or wireless communication links 617. The DVD 610 may communicate with mass data storage 618 that stores data in a nonvolatile manner. The mass data storage 618 may include a hard disk drive (HDD). The HDD may have the configuration shown in FIG. 6A. The HDD may be a mini HDD that includes one or more platters having a diameter that is smaller than approximately 1.8". The DVD 610 may be connected to memory 619 such as RAM, ROM, nonvolatile memory such as flash memory and/or other suitable electronic data storage.

Figure 6C:
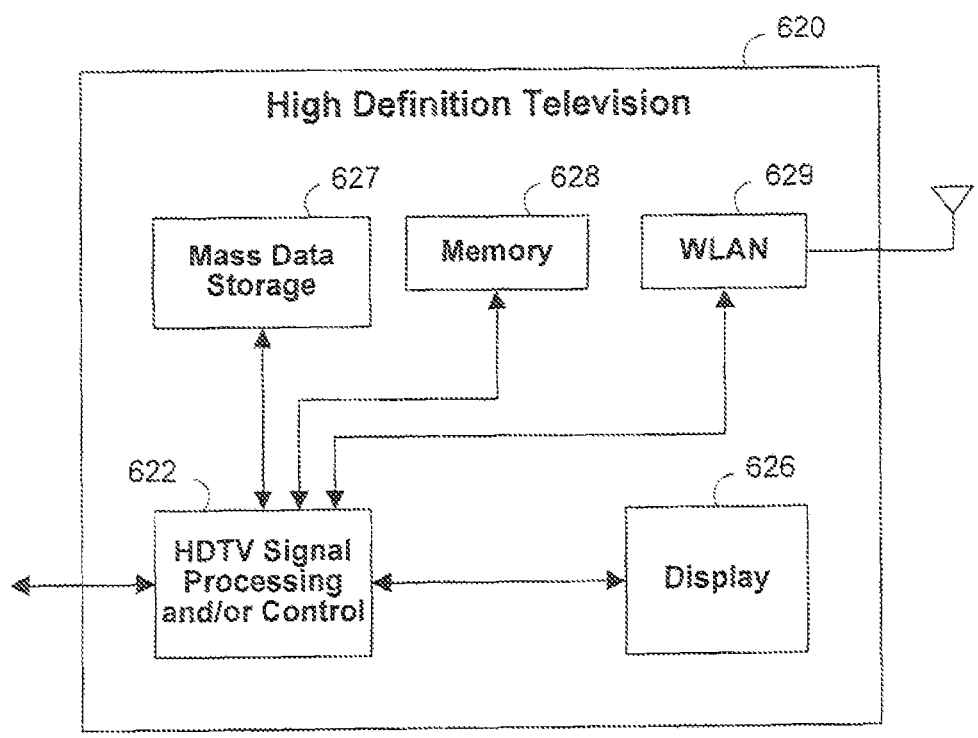
FIG. 6C is a block diagram of an exemplary high definition television that can employ the disclosed invention.

Referring now to FIG. 6C, the present invention can be implemented in a high definition television (HDTV) 620. The present invention may be implemented as part of the signal processing and/or control circuits, which are generally identified in FIG. 6C at 622, a WLAN interface 629 and/or mass data storage 627 of the HDTV 620. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The HDTV 620 may be connected to memory 628 such as RAM, ROM, nonvolatile memory such as flash memory and/or other suitable electronic data storage. The HDTV 620 also may support connections with a WLAN via a WLAN network interface 629.

Figure 6D:
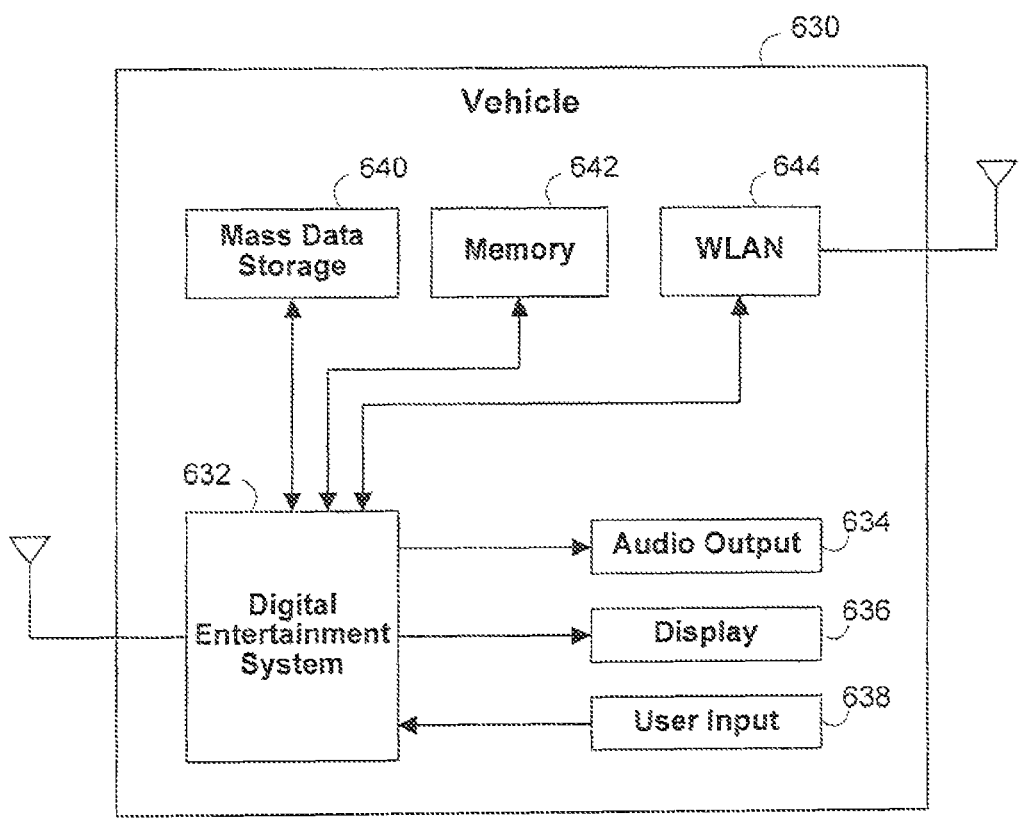
FIG. 6D is a block diagram of an exemplary vehicle that can employ the disclosed technology.

Referring now to FIG. 6D, the present invention may be implemented in a digital entertainment system 632 of a vehicle 630, which may include a WLAN interface 644 and/or mass data storage 640.

The digital entertainment system 632 may communicate with mass data storage 640 that stores data in a nonvolatile manner. The mass data storage 640 may include optical and/or magnetic storage devices such as hard disk drives (HDDs) and/or DVD drives. The HDD may be a mini HDD that includes one or more platters having a diameter that is smaller than approximately 1.8". The digital entertainment system 632 may be connected to memory 642 such as RAM, ROM, nonvolatile memory such as flash memory and/or other suitable electronic data storage. The digital entertainment system 632 also may support connections with a WLAN via the WLAN interface 644. In some implementations, the vehicle 630 includes an audio output 634 such as a speaker, a display 636 and/or a user input 638 such as a keypad, touchpad and the like.

Figure 6E:
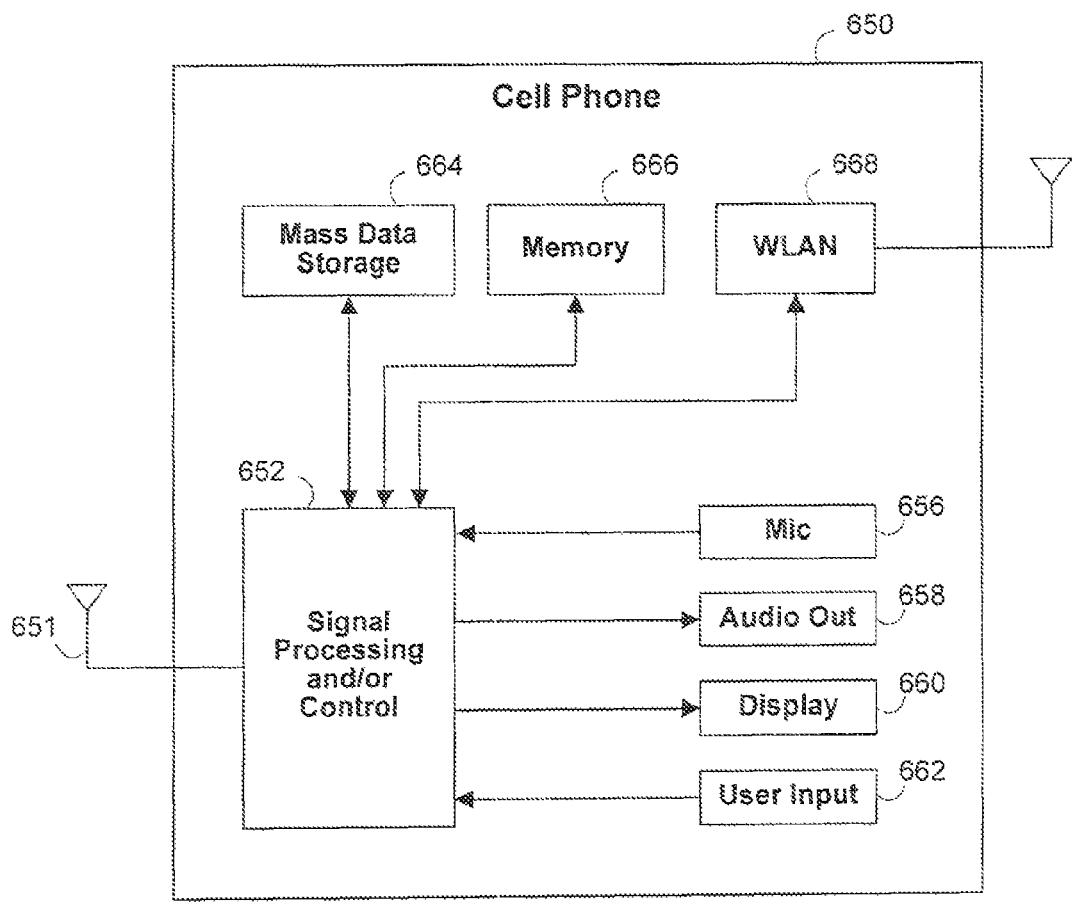
FIG. 6E is a block diagram of an exemplary cell phone that can employ the disclosed technology.

Referring now to FIG. 6E, the present invention can be implemented in a cellular phone 650 that may include a cellular antenna 651. The present invention may be implemented as part of the signal processing and/or control circuits, which are generally identified in FIG. 6E at 652, a WLAN interface 668 and/or mass data storage 664 of the cellular phone 650. In some implementations, the cellular phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the cellular phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The cellular phone 650 may be connected to memory 666 such as RAM, ROM, nonvolatile memory such as flash memory and/or other suitable electronic data storage. The cellular phone 650 also may support connections with a WLAN via a WLAN network interface 668.

Figure 6F:
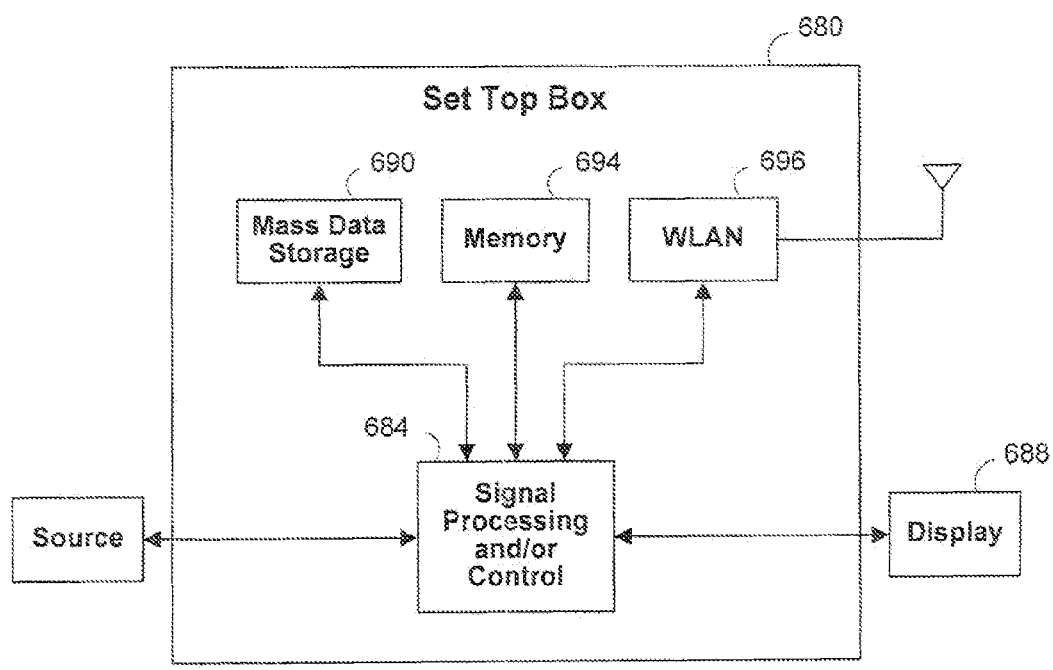
FIG. 6F is a block diagram of an exemplary set top box that can employ the disclosed technology.

Referring now to FIG. 6F, the present invention can be implemented in a set top box 680. The present invention may be implemented as part of the signal processing and/or control circuits, which are generally identified in FIG. 6F at 684, a WLAN interface 966 and/or mass data storage 660 of the set top box 680. The set top box 680 receives signals from a source such as a broadband source and outputs standard and/or high definition audio/video signals suitable for a display 688 such as a television and/or monitor and/or other video and/or audio output devices. The signal processing and/or control circuits 684 and/or other circuits (not shown) of the set top box 680 may process data, perform coding and/or encryption, perform calculations, format data and/or perform any other set top box function.

The set top box 680 may communicate with mass data storage 660 that stores data in a nonvolatile manner. The mass data storage 660 may include optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The set top box 680 may be connected to memory 664 such as RAM, ROM, nonvolatile memory such as flash memory and/or other suitable electronic data storage. The set top box 680 also may support connections with a WLAN via a WLAN network interface 966.

Figure 6G:
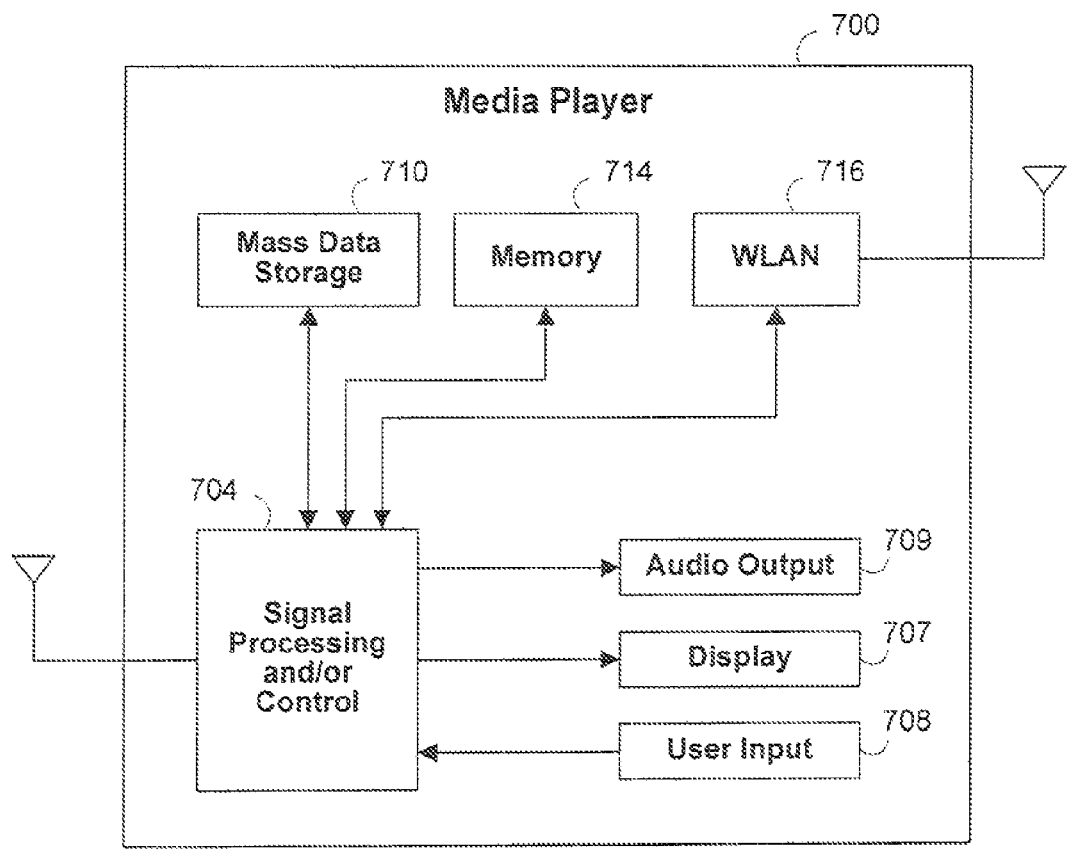
FIG. 6G is a block diagram of an exemplary media player that can employ the disclosed technology.

Referring now to FIG. 6G, the present invention can be implemented in a media player 700. The present invention may be implemented as part of the signal processing and/or control circuits, which are generally identified in FIG. 6G at 704, a WLAN interface 716 and/or mass data storage 710 of the media player 700. In some implementations, the media player 700 includes a display 707 and/or a user input 708 such as a keypad, touchpad and the like. In some implementations, the media player 700 may employ a graphical user interface (GUI) that typically employs menus, drop down menus, icons and/or a point-and-click interface via the display 707 and/or user input 708. The media player 700 further includes an audio output 709 such as a speaker and/or audio output jack. The signal processing and/or control circuits 704 and/or other circuits (not shown) of the media player 700 may process data, perform coding and/or encryption, perform calculations, format data and/or perform any other media player function.

The media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage 710 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 700 may be connected to memory 714 such as RAM, ROM, nonvolatile memory such as flash memory and/or other suitable electronic data storage. The media player 700 also may support connections with a WLAN via a WLAN network interface 716. Still other implementations in addition to those described above are contemplated.

The disclosed circuits, components, and methods can be implemented using means such as digital circuitry, analog circuitry, and/or a processor architecture with programmable instructions. Additionally, components and/or methods that store information or carry signals can operate based on electrical, optical, and/or magnetic technology, and can include devices such as flip-flops, latches, random access memories, read-only memories, CDs, DVDs, disk drives, or other storage or memory means. The disclosed embodiments and illustrations are exemplary and do not limit the scope of the disclosed technology as defined by the following claims.

What is claimed is:

1. A method for generating film grain for a digital video stream, comprising:
    receiving a digital video stream;
    generating a noise signal in response to said receiving;
    filtering the noise signal to produce a film grain;
    adjusting film grain amplitude based on intensity levels of pixels of the digital video stream;
    incorporating variations based on a temporal pattern into the film grain; and
    combining the film grain with the digital video stream to produce a grained digital video stream.

2. The method of claim 1, wherein generating the noise signal comprises generating a pseudorandom stream of noise samples.

3. The method of claim 2, wherein the pseudorandom stream of noise samples are generated in real-time.

4. The method of claim 2, wherein generating the pseudorandom stream of noise samples comprises generating the pseudorandom stream of noise samples using a pseudorandom generator polynomial.

5. The method of claim 4, wherein the pseudorandom generator polynomial comprises a Fibonacci polynomial.

6. The method of claim 1, wherein the noise signal comprises a plurality of noise samples and wherein filtering comprises filtering only a subplurality of the generated samples.

7. The method of claim 6, wherein filtering comprises filtering only one out of every four of the generated samples.

8. The method of claim 1, wherein filtering comprises a high-pass filter.

9. The method of claim 1, further comprising filtering the noise signal in two dimensions and wherein the filtering comprises storing at least two lines of the noise signal.

10. The method of claim 1, further comprising filtering the noise signal in two dimensions and wherein the filtering comprises simultaneously generating at least three lines of noise signal.

11. A method for generating film grain for a digital video stream, comprising:
    receiving a digital video stream that is associated with a plurality video pixels;
    generating film grain that is associated with a plurality of film grain pixels, wherein each film grain pixel is associated with a corresponding video pixel;
    adjusting an amplitude of a subplurality of the generated film grain pixels in response to an intensity level of their corresponding video pixels;
    incorporating variations based on a temporal pattern into the film grain; and
    combining the adjusted film grain with the digital video stream to produce a grained digital video stream.

12. The method of claim 11, wherein adjusting the intensity level of the generated film grain pixels comprises limiting the intensity level of the generated film grain pixels as the intensity level of their corresponding video pixels approaches a maximum or a minimum value.

13. The method of claim 11, wherein adjusting the intensity level of the generated film grain pixels comprises reducing the intensity level of the generated film grain pixels to zero as the intensity level of their corresponding video pixels approaches a maximum or a minimum value.

14. A system for generating film grain for a digital video stream, comprising:
    a video processing circuit that receives a digital video stream;
    a film grain generator circuit that:
        receives the digital video stream from the video processing circuit;
        generates a noise signal in response to the digital video stream;
        filters the noise signal to produce a film grain;
        adjusts film grain amplitude based on intensity levels of pixels of the digital video stream;
        incorporates variations based on a temporal pattern into the film grain; and
        combines the film grain with the digital video stream to produce a grained digital video stream.

15. The system of claim 14, wherein generating the noise signal comprises generating a pseudorandom stream of noise samples.

16. The system of claim 15, wherein the pseudorandom stream of noise samples are generated in real-time.

17. The system of claim 14, wherein the noise signal comprises a plurality of noise samples and wherein filtering comprises filtering only a subplurality of the generated samples.

18. The system of claim 14, wherein the film grain generator circuit filters the noise signal in two dimensions and wherein the filtering comprises storing at least two lines of the noise signal.

19. The system of claim 14, wherein the film grain generator circuit filters the noise signal in two dimensions and wherein the filtering comprises simultaneously generating at least three lines of noise signal.

20. A system for generating film grain for a digital video stream, comprising:
 a video processing circuit that receives a digital video stream that is associated with a plurality video pixels;
 a film grain generator circuit that:
  generates film grain that is associated with a plurality of film grain pixels, wherein each film grain pixel is associated with a corresponding video pixel;
  adjusts an amplitude of a subplurality of the generated film grain pixels in response to an intensity level of their corresponding video pixels;
  incorporates variations based on a temporal pattern into the film grain; and
  combines the adjusted film grain with the digital video stream to produce a grained digital video stream.

21. The system of claim 20, wherein adjusting the intensity level of the generated film grain pixels comprises limiting the intensity level of the generated film grain pixels as the intensity level of their corresponding video pixels approaches a maximum or a minimum value.

22. The system of claim 20, wherein adjusting the intensity level of the generated film grain pixels comprises reducing the intensity level of the generated film grain pixels to zero as the intensity level of their corresponding video pixels approaches a maximum or a minimum value.

* * * * *